July 21, 1942.  S. FLEISCHMANN  2,290,369
STRUCTURAL BODY
Filed April 2, 1940
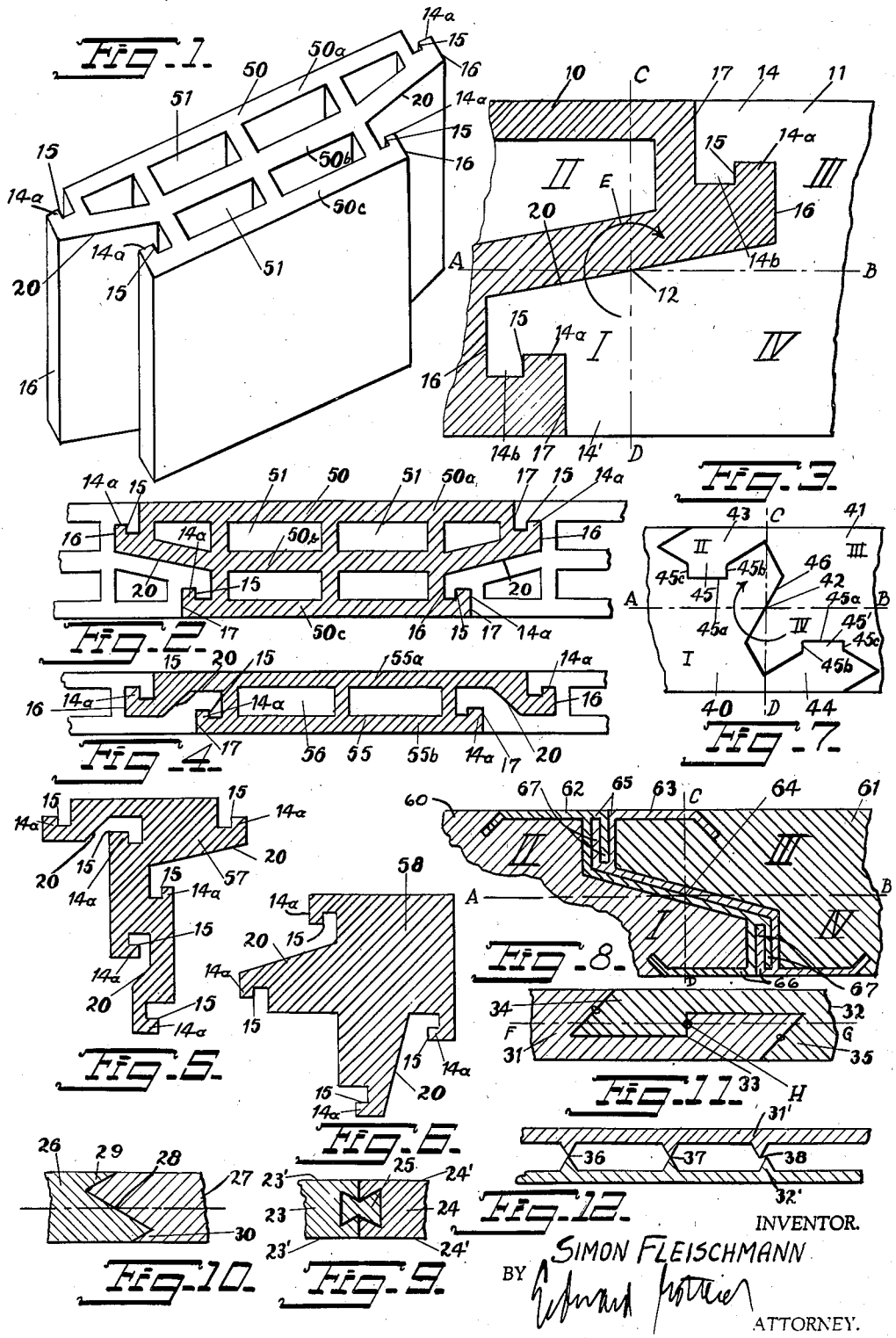
INVENTOR.
SIMON FLEISCHMANN
BY Edward Gottlieb
ATTORNEY.

Patented July 21, 1942

2,290,369

UNITED STATES PATENT OFFICE 2,290,369

STRUCTURAL BODY

Simon Fleischmann, New York, N. Y., assignor of one-half to Carl Holub, New York, N. Y.

Application April 2, 1940, Serial No. 327,402

1 Claim. (Cl. 72—38)

This invention relates to new and useful improvements in a structural joint formed from adjacent bodies.

The invention proposes a structural joint as mentioned of exceptional strength in compression, in tensile and in bending in all directions, which joint resorts to no special foreign binding means or fastening means to achieve its strength and holding action.

More specifically, the invention proposes a structural joint characterized by a pair of adjacent bodies having a common central axis and several mortice and tenon parts having interengaging hook portions in the skin sections of the body, and each pair of interengaging hook portions having a pair of surfaces on parts in close proximity to each other and arranged to take tensile, compression and bending stresses.

In the past numerous attempts have been made to produce a structural joint of the type mentioned. However, in all of such prior attempts there was always present an inherent weakness, due particularly to a lack of technical knowledge and clear comprehension of the various stresses involved in a joint. In some of the prior constructions dowels or tongue elements were used to take the tensile stresses. Also, in some of the prior constructions obliquely cut "scarfs" and joint parts were made to take bending stresses. Similar provisions were made to take torsion and twisting stresses. However, the inherent weaknesses of the prior joints lay in the fact that the points for taking these various stresses were separated from each other and consequently it required particularly accurate work for the various parts to contact and interengage and function simultaneously. As a result one or more of the parts would not be in proper functioning condition (as will appear more fully as this specification proceeds) and hence a weak joint was produced.

One frequent error in the prior constructions resided in placing the dowel connection, tongue connection or scarf upon the central axis. While this is satisfactory for absorbing tension it does not assist materially in absorbing bending stresses.

A dominating object of this invention resides in so placing and arranging the holding portions of the joint that there is a minimum of contacting points at a minimum of separated positions designed to absorb a maximum of types of stresses, viz: bending, compression and tensile stresses.

Still further the invention proposes to arrange symmetrically the portions of the joint in a manner so as to produce a simple form of block as contrasted with the fantastic shapes of blocks and structural joints heretofore produced.

Furthermore, the invention contemplates a construction of structural joint which is adapted to be used for many purposes including building blocks, and other bodies of various types and forms for various purposes.

Another object of the invention is the construction of a device as described which is simple and durable and which is adapted to be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Fig. 1 is a perspective view of a building block embodying a structural joint in accordance with this invention.

Fig. 2 is a plan view of a wall constructed from building blocks shown in Fig. 1, one of the blocks being shown in section and the other in elevation, for illustrative purposes.

Fig. 3 is an enlarged detailed view of a portion of Fig. 2 to show one of the structural joints.

Fig. 4 is a plan view of another wall from building blocks having structural joints in accordance with this invention, one of the blocks being shown in section for illustrative purposes.

Fig. 5 is a sectional view of a T-shaped building block embodying structural joints in accordance with this invention.

Fig. 6 is a sectional view of an L-shaped block with a structural joint in accordance with this invention.

Fig. 7 is a plan view of a pair of adjacent building blocks with an interengaged structural joint in accordance with a further embodiment of this invention.

Fig. 8 is a sectional view of a pair of adjacent bodies with metal brackets embodying a structural joint constructed in accordance with this invention.

Fig. 9 is a sectional view of adjacent bodies with a joint of old construction illustrated to more particularly point out the instant invention.

Fig. 10 is another sectional view of adjacent bodies with another joint of old construction.

Fig. 11 is another sectional view of adjacent bodies with still another joint of old construction.

Fig. 12 is a sectional schematic view illustrating the dominating defects in prior structural joints.

The invention may best be understood by examining Fig. 3 and noting that the structural joint, in accordance with this invention, comprises a pair of adjacent bodies 10 and 11 having a common central axis 12 and a mortice and tenon 14 to one side of the axis 12, and another mortice and tenon 14' to the other side of the axis 12, and these mortices and tenons being provided with interengaging hook portions 14a and 14b, respectively. Each pair of interengaged hook portions is provided with a pair of accurate surfaces 15 and 16, or 17 in parts in close proximity to each other arranged to take tensile, compression and bending stresses on the joint.

It is pointed out that the hooks of the joint are equal distances from the central axis 12. Moreover, attention is called to the fact that the hooks are symmetrical in relation to central planes AB and CD at right angles to each other passing through the axis 12. These planes dividing off four quadrants, indicated on the drawing by numerals I, II, III and IV. Each hook portion is layed out in one of the quadrants and continues into a side 20 which passes through the axis 12, and the particular construction is reproduced in a quadrant spaced 180° from the first-named quadrant. For example, the construction illustrated in quadrant I in Fig. 3 must be rotated through 180° in the direction indicated by the arrow E to locate an identical formation in quadrant III. The line 20 which joins the hook portions is shown to be a straight line, but this is only a matter of choice in design, as this line may have any shape whatsoever as long as it does not interfere with the operation of the hook portions, as will be more particularly described as this specification proceeds.

To understand the technical advantages of the joint illustrated in Fig. 3 it is advisable that some consideration be given to Figs. 9 to 12, which are schematic figures schematically pointing out defects in prior structural joint constructions. In Fig. 9 a pair of adjacent bodies 23 and 24 is shown connected together with a joint which comprises a dovetailed dowel or scarf 25 connecting the parts. While this particular joint is satisfactory in so far as tension and compression is concerned, it is objectionable in so far as bending is concerned. If a bending stress is placed on this joint the maximum tensile and compression stresses will occur in the skins 23' and 24' of these bodies, and yet there are no joining or holding elements at these points. The strongest portion of the joint lies along the longitudinal axis where it is not required in so far as bending is concerned. As a consequence the joint in Fig. 9 is relatively weak with relation to bending.

In so far as the joint shown in Fig. 10 is concerned (this being also an old type of joint) it is satisfactory under bending but unsatisfactory under tension. This joint comprises adjacent bodies 26 and 27 which are connected together by an oblique mortice and tenon joint 28. This joint has interlocking parts 29 and 30 in the skin portions thereof. These interlocking parts 29 and 30 will suitably take the tensile and compression stresses in the elements of the skin due to bending, but lacks longitudinal tensile absorbing elements.

Fig. 11 shows another old type of joint. In this joint there are adjacent bodies 31 and 32 which are joined together by a central hook portion 33 suitable for tension, and oblique portions 34 and 35 suitable for bending. However, this joint is unsatisfactory for an important reason. The parts of the joint are well separated from each other, and if there is any inaccuracy in the construction of the joint one or more of the parts will not function, and thus the joint has a weak spot. The longitudinal axis of the joint is indicated by the line FG and the central axis by the point H. Note that the interengaging hook portions 33 are at the central axis H and hence do not contribute anything in so far as bending is concerned. The oblique end portions 34 and 35 do not contribute anything in so far as tension is concerned.

Fig. 12 schematically illustrates the defect of the construction shown in Fig. 11. In Fig. 12 there are two bodies 31' and 32' which have three points of contact 36, 37 and 38 at spaced positions from each other. It is generally known that two points determine a straight line, and a third point may or may not be on the line. Similarly, three points determine a plane, and a fourth point may or may not be on the plane. With respect to Fig. 12, two of the points must touch each other, but the third point may or may not, depending upon accuracy of construction. As illustrated the bodies 31' and 32' touch at the points 36 and 37, but the point 38 misses, or the defect may manifest itself in the points 36 and 38 touching and the point 37 missing, etc.

Now returning to Fig. 11, it should be understood that the joint in order to be effective in tension, in compression and in bending must have the three portions 33, 34 and 35 operating simultaneously. If but two of these portions contact and the third misses, the joint will be defective. It is not practical to construct building blocks and most structural joints very accurately. In fact the tolerances are quite high, and invariably a construction as shown in Fig. 11 or in equivalent constructions one of the points will be out of operation.

Now that the weaknesses of the prior constructions have been reviewed it is best to reconsider the joint shown in Fig. 3. In this figure the joint has a portion with the surfaces 15 which take the tension, not located at the central axis 12, but located as close to the skin of the bodies 10 and 11 as is practical. The portions with the surfaces 15 are therefore calculated not only to take tensile loads but also to take bending stresses. The hook portions 14a and 14b are immediately in the vicinity of the surfaces 15. These hook portions are designed to take bending stresses. They are located as near as is practical in the skin of the bodies 10 and 11, which are the areas in which the greatest tensile and compression stresses due to bending occur. Compression in the longitudinal direction will be taken by the portions having the surfaces 16 or 17. Thus the joint shown in Fig. 3 is superior to prior joints in so far as the portions which take tension, compression and bending are substantially located at common points or areas. Of course, certain surfaces of the joint shown in Fig. 3 must be accurate, but these surfaces are relatively small and close together. It would be satisfactory for the surfaces 15 and the surfaces 16 or 17 to be accurate. The other surfaces may have large tolerances without producing any weakness in the structural joint.

It should be borne in mind that the particular shape of the hooks or the portions with the finished surfaces of the structural joint, in accordance with this invention, are not important. The important part is their location and arrangement. For example, a different design of structural joint has been disclosed in Fig. 7 which embodies all the features of this invention. In Fig. 7 there is an adjacent pair of bodies 40 and 41 having a common central axis 42 and a mortice and tenon 43 on one side of the central axis, and a similar mortice and tenon 44 on the other side of the central axis. These portions have interengaging hook portions 45 and 45' arranged in the skin sections of the bodies 40 and 41, and each of these pairs of interengaged hook portions has portions with a pair of surfaces 45a and 45b or 45c in close proximity to each other arranged to take tensile, compression and bending stresses on the joint. It should be clear that it is not the surfaces which take these stresses but rather the material which has these surfaces.

This joint also is provided with the central planes AB and CD at right angles to each other through the central axis 42 dividing off quadrants I, II, III and IV, and the joint portions in quadrants II and IV are obtained by constructing the portions in one of the quadrants and rotating the same 180° about the axis 42. Numeral 46 indicates the joining line between the two mortices and tenons which pass through the axis 42. This line 46 may be straight or may have any other desired form.

In Figs. 1 and 2 a building block 50 is illustrated having spaced openings 51 arranged in adjacent lines dividing off three wall portions 50a, 50b and 50c. The ends of this block 50 are constructed with joint elements identical to the joint elements described in Fig. 3, and corresponding parts may readily be identified by like reference numerals.

In Fig. 4 a building block 55 is illustrated having one line of spaced openings 56 dividing off a front wall 55a and a rear wall 55b. The ends of this block are provided with portions forming a structural joint identical to the portion shown in Fig. 3, and the corresponding parts may be identified by like reference numerals.

In Fig. 5 a T-shaped body 57 has been illustrated having the ends of its head and the bottom of its stem formed with portions of a structural joint identical to the joint portion shown in Fig. 3. Identical parts may be identified by the same reference numerals.

In Fig. 6 and L-shaped body 58 is shown which may be used as a corner and the ends of the arms of this body are provided with joint elements identical to the joint elements shown in Fig. 3, and the same parts have been indicated by like reference numerals.

In Fig. 8 another modified form of the invention has been disclosed which in principle is identical to the form shown in Fig. 3. However, the construction is somewhat different. In this joint there are adjacent bodies 60 and 61 which have their adjacent ends provided with metallic brackets 62 and 63. These metallic brackets having a common central axis 64 and a mortice and tenon 65 on one side of the axis 64, and a similar mortice and tenon 66 on the other side of the neutral axis. A pair of central planes AB and CD are illustrated passing through the axis 64 dividing off quadrants I, II, III and IV. The bracket portions in quadrants II and IV are identical, produced by rotating the design shown in one quadrant about the neutral axis 64 through 180° to the other quadrant. The mortice and tenon constructions 65 and 66 have interengaging hook portions 67 in the skins of the bodies 60 and 61, and each of these pairs of interengaging hook portions have a pair of finished surfaces in close proximity to each other and arranged to take tensile, compression and bending stresses of the joint.

For clarity and illustration the hook portions 67 and the brackets 62 and 63 are shown slightly separated from each other. It should be understood that the finished surfaces must be contacting each other in the practical embodiment of the invention.

The structural joint, according to this invention, has a decided advantage over prior constructions in the case of grouting (mortarizing), the mortar serving in this instance only for the purpose of filling the joints. This filling may be provided to eliminate noise, humidity, heat, or act as a rain duct. Frequently, it is impossible for practical and technical reasons to effect an absolutely tight seal at the joint. In that event, in accordance with this invention, it is sufficient to grout (mortarize) the two main finished contact surfaces of the structural joint parts without disturbing the function assigned to the joint. This clearly contrasts with prior constructions operating with three contact points which may readily be out of line after grouting.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A structural body for wall or floor construction having flat parallel front and back faces of identical heights, said front face being narrower in width than said rear face, and said body also having identical end portions each of which has an inclined face wall portion extending laterally and rearwards and located centrally of said front and back faces, a rearwardly directed hook portion on the outer edge portion of said inclined face wall portion, and a hook portion which is complementary to said hook portion of an adjacent body and located on the inner edge portion of said inclined face wall portion, substantially as shown and described.

SIMON FLEISCHMANN.